United States Patent [19]

Ernster

[11] Patent Number: 5,077,062

[45] Date of Patent: Dec. 31, 1991

[54] HYDROLYZED SOY PROTEIN AND PROCESS FOR PREPARING SOY PROTEIN

[75] Inventor: John H. Ernster, Rancho Palos Verdes, Calif.

[73] Assignee: Excelpro Inc., Los Angeles, Calif.

[21] Appl. No.: 518,738

[22] Filed: May 3, 1990

[51] Int. Cl.$^5$ ............................ A23L 1/20; A23L 1/22
[52] U.S. Cl. .................................. 426/46; 426/52; 426/63; 426/656; 426/72; 426/650
[58] Field of Search ............ 426/46, 52, 63, 656, 426/650, 72

[56]  References Cited

U.S. PATENT DOCUMENTS

| | | | |
|---|---|---|---|
| 4,363,820 | 12/1982 | Ernster | 426/257 |
| 4,545,933 | 10/1985 | Ernster | 260/119 |
| 4,871,575 | 10/1989 | Callahan | 426/643 |

Primary Examiner—Marianne Cintins
Attorney, Agent, or Firm—Herb Boswell

[57]  ABSTRACT

A low sodium, low monosodium glutamate soy hydrolysate is prepared from a soy material, as for instance, soy flour, soy meal or soy grits by hydrolyzing the soy material with a protease enzyme in water. The hydrolysis is conducted in the absence of the addition of either acid or base at a temperature of about 90° for 2 hours. After deactivating the enzyme and dewatering the mixture the resulting hydrolysate contains from about 45 to about 55 weight percent of enzymatic hydrolyzed soy based protein, from about 1 to about 3 weight percent fat, from about 5 to about 9 weight percent ash, from about 2 to about 8 weight percent water, from about 32 to about 36 weight percent carbohydrate, and less than 0.1 weight percent sodium.

14 Claims, 2 Drawing Sheets

HYDROLYZED SOY PROTEIN AND PROCESS FOR PREPARING SOY PROTEIN

BACKGROUND OF INVENTION

This invention is directed to a soy hydrolysate low in both sodium and monosodium glutamate and to a process for preparing the same.

Hydrolyzed vegetable protein, sometimes referred to as HVP is utilized to enhance the flavor of a wide range of food products including, among others, soups, gravies, sauces, bouillon, salad dressings, snack foods, processed meats and canned meats. A commonly utilized base material for preparing these hydrolyzed vegetable proteins is the solids remaining from soy beans after they have been dehulled and deoiled. The soy material is converted to a hydrolyzed vegetable protein via acid hydrolysis or enzymatic hydrolysis conducted under acidic conditions. The hydrolyzed vegetable protein resulting from these hydrolysis typically has a very large percentage of salts therein, upwards of 50%, and further contains a high percentage of monosodium glutamate, about 10%, which is derived from glutamic acid liberated during the hydrolysis.

Hydrolyzed vegetable protein is utilized as an additive to certain canned meat products, as for instance canned tuna. The addition of hydrolyzed vegetable protein to canned tuna prevents the migration of natural juices and natural products that are soluble in these juices from the flesh of the tuna to the broth in the can. If hydrolyzed vegetable protein is not added as an additive to canned tuna, the migration of the natural juices and natural solubles from the flesh to the liquid contents of the can could resulted in a reaction between the interior metallic surface of the can and the tuna juices. The reaction between the can and the juices results in a metallic taste being imparted to the contents of the can including the tuna. By adding hydrolyzed vegetable protein to the contents of the canned tuna, the loss of the natural juices from the tuna flesh is inhibited and this in turn inhibits the transfer of a metallic taste to the tuna flesh. This ability to retard metallic taste in tuna has resulted in the wide spread use by the tuna canning industry of hydrolyzed vegetable protein as an additive to canned tuna.

Recent medical evidence reflects the desirability of decreasing the intake of sodium chloride, i.e. common table salt, in the human diet. With the ready availability of table salt as a seasoning and with the addition of table salt in many processed foods consumed in industrialized countries, a typical resident of such industrialized countries has a daily salt intake far and above their nutritional requirements. Indeed, the excess salt intake in industrialized countries contributes to poor health of their citizens because of the promotion of hypertension and other such maladies brought on by excess salt intake.

Monosodium glutamate, i.e. the sodium salt of glutamic acid, a major constituent of many proteins, is also used as a seasoning. Excess intake of monosodium glutamate has been indicated as being the cause of a syndrome commonly referred to as the Chinese Restaurant Syndrome. This syndrome is usually acquired after eating food which is seasoned with excessive amounts of monosodium glutamate.

Glutamic acid constitutes about 20% of the protein in soy protein. Acid hydrolysis of soy products typically liberates all the glutamic acid as a free amino acid. When the acid utilized for the acid hydrolysis is subsequently neutralized with an appropriate base, as for instance sodium hydroxide, the glutamic acid is converted to monosodium glutamate. Hydrochloric acid typically is used for the acid hydrolysis of soy protein. When this hydrochloric acid is neutralized, the chloride ion from the hydrochloric acid is converted to sodium chloride, i.e. common salt. Since protein derived from soy based products typically represents about 50% of that product, after acid hydrolysis and neutralization the hydrolyzed protein from a soy base product typically will contain 10% monosodium glutamate (derived from the 20% glutamic acid fraction of the protein) as well as large amounts of salt, up to about 50% by weight of salt.

When acid hydrolyzed vegetable protein is utilized as an additive to other food products, as for instance canned tuna, while the beneficial effects of the hydrolyzed vegetable protein are achieved, i.e. retention of the natural juices and the solubles therein within the tuna flesh, concurrently adverse properties can also be imparted to the canned tuna because of the increase of its salt content and the increase in the monosodium glutamate content. While tuna flesh itself contains an inherent amount of monosodium glutamate, as for instance about 0.25%, it is evident that the monosodium glutamate content of canned tuna will be significantly raised by adding a hydrolyzed vegetable protein since the hydrolyzed vegetable protein can contain up to 10% monosodium glutamate. Thus while the use of hydrolyzed vegetable protein as an additive to canned tuna contributes to a more desirable product with respect to taste, retention of natural juices and the like, it concurrently also contributes excess amounts of monosodium glutamate and sodium chloride which are counter indicated for health reasons.

It has also recently been found that certain mutagens can also be produced when vegetable protein is hydrolyzed in closed vessels under pressure. These mutagens are 1,3-dichloropropanol, commonly referred to as dichloropropanol, and 1-chloro-2-propanol and 3-chloro-1-propanol, commonly referred to as monochloro-1-propanol. While the amounts of dichloropropanol and monochloropropanol found in typical hydrolyzed vegetable protein is very low, nevertheless minute traces are still found. When these minute traces are multiplied by the millions of pounds of hydrolyzed vegetable protein which is sold and consumed each year, the potential for adverse health effects inflected on the consumer by dichloropropanol and monochloropropanol is increased.

BRIEF SUMMARY OF THE INVENTION

In view of the above it is evident that there exists a need for new and improved hydrolyzed vegetable protein products which are low in sodium chloride and low in monosodium glutamate. It is a broad object of this invention to provide such improved hydrolyzed vegetable protein products and process for the preparation thereof.

These objects and other objects as will become evident from the remainder of this specification are achieved in a low sodium, low monosodium glutamate containing soy hydrolysate which comprises from about 45 to about 55 weight percent of an enzymatically hydrolyzed soy based protein, from about 1 to about 3 weight percent fat, from about 5 to about 9 weight percent ash, from about 2 to about 8 weight percent water, from about 32 to about 36 weight percent carbohydrate and less than 0.1 weight percent sodium.

The objects of the invention are also achieved in a process for preparing such a hydrolyzed soy protein which comprises selecting a soy material from the group consisting of soy flour, soy meal and soy grits and admixing this material with a quantity of water. A quantity of a protease enzyme is added to the soy product in the water. The mixture of the soy material and the enzyme in the water is then mixed while heating to a temperature of from about 85° F. to about 100° F. The mixture is maintained at this temperature for a time period of from about 1 hour 45 minutes to about 2 hours 15 minutes to partially enzymatically hydrolyze the protein in the soy material. The enzyme is then deactivated and the mixture is dried to a solids level of about 90% solids.

The process of the invention hydrolyzes the protein in the soy material only to the extent that about 50% to about 55% of the peptide bonds of the so material are hydrolyzed. The hydrolysis product consists mainly of small chain oligopeptides and essentially no free amino acids.

In a preferred embodiment of the process the final solids level of the product has from about 92 to about 98 weight percent solids. The pH of the resulting material has a pH of from about 6.6 to about 7.2. Such a neutral pH results from conducting the hydrolysis at essentially neutral conditions, i.e. the same pH, 6.6 to about 7.2. Since the hydrolysis is not conducted under acidic conditions there is no need for neutralization of any acid components with a sodium based material, and as such the resulting sodium level of the product from the process is preferable below 0.06 percent sodium by weight.

Preferable the mixing and heating of the soy material and the enzyme in water is conducted by injecting steam in an open vessel into the mixture to raise the temperature to a preferred temperature of 90° F. The soy material and the added enzyme form a very thick solution which is held at a preferred temperature of 90° F. for 2 hours to hydrolyze the protein component of the soy material to the preferred hydrolysis level of about 50 to about 55 percent hydrolysis of the peptide bonds of the protein in the soy material.

The quantities of the soy based material and water are chosen such that during hydrolysis the soy based material is present at an amount of from about 15 weight percent to about 30 weight percent with the preferred range being from about 26 weight percent to about 28 weight percent of the soy material in water. Preferable during the hydrolysis the solubilized soy material and the enzyme in water are stirred in an open reaction vessel with a high shear mixing impeller to insure complete dispersion of the components utilized in the process.

Preferable the enzyme utilized for the hydrolysis is a protease enzyme selected from fungal proteases and bacterial proteases with the fungal protease derived from Aspergillus niger var being a particularly preferred protease enzyme. Preferable the protease enzyme is deactivated by heat deactivation of the same, as for instance at 185° for 20 minutes.

Use of steam injection for heating the soy material and the enzyme in the water to the hydrolysis temperature results in less than 5 parts per million formation of cholopropanols. The hydrolysis conditions are such that essentially none of the amino acids of the proteins of the soy material are destroyed and as such the amino acid profile of the soy hydrolysate of the invention is essentially equivalent to that of the soy material before hydrolysis.

Typically the enzymatically hydrolyzed soy protein in the product of the invention has an average molecular weight of about 670,000 based on a standard molecular weight of about 1,400,000 for an unhydrolyzed soy flour protein. The soy hydrolysate of the invention, as isolated using the process of the invention, typically also has a metals content equivalent to that of the starting soy material insofar as no additional metals are added because of acid or base hydrolyzing conditions. Potassium is thus present at a level less than about 2.5 weight percent, calcium, magnesium and phosphorus are present at a level of less than 0.1 weight percent and other metals including aluminum, barium, chromium, copper, iron, manganese, strontium and zinc are present at amounts less than 0.01 weight percent.

BRIEF DESCRIPTION OF THE DRAWINGS

This invention will be better understood when taken in conjunction with the drawings wherein.

DETAILED DESCRIPTION OF THE INVENTION

Figure 1:
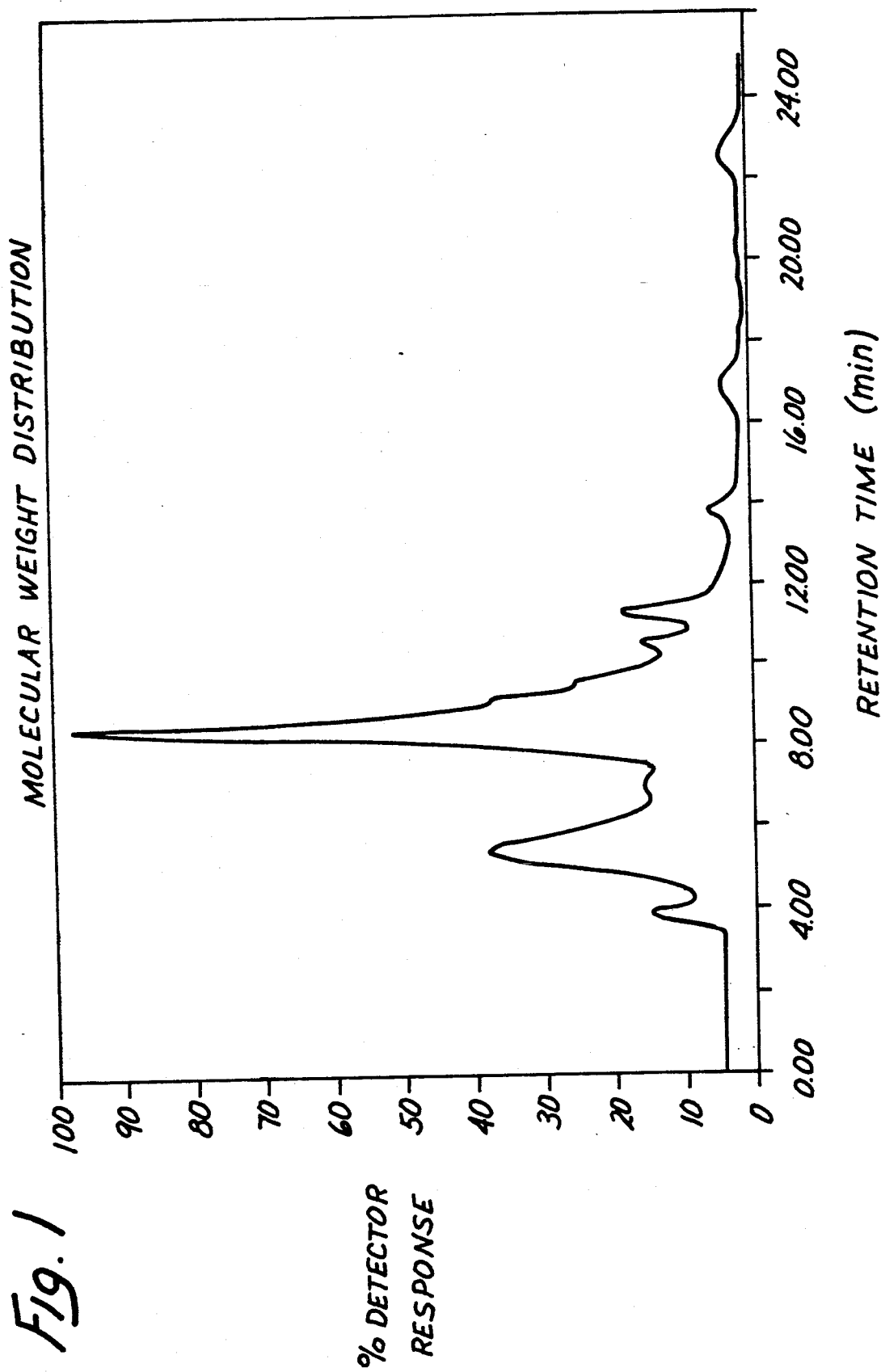
FIG. 1 is a graph of the molecular weight distribution of the soy hydrolysate of the invention wherein the molecular weight distribution is derived from the retention times of the soy hydrolysate of the invention through an HPLC column.

As an aid in the understanding of this invention, a brief discussion with respect to the processing of soy beans and the hydrolysis of the same will facilitate the understanding of the invention.

Soy beans are grown in large quantities in both the United States and in other countries. After harvesting, the soy beans can be stored or processed directly. For processing, they are first screened to remove foreign material and then cracked. The hulls are removed from the cracked beans leaving bean chips. These bean chips are conditioned by heating and then passed through flaking rollers to yield full fat flakes. The full fat flakes are treated with solvents (generally hexane) in a solvent extraction tower. The soy bean oil as well as certain other lipid components, i.e. lecithin, are soluble or miscible in the solvent and are separated from the defatted flakes. Soy bean oil and lecithin phospholipids can be recovered from the solvent by distillation or other similar processes.

The defatted flakes are treated to remove excess solvent and then cooked and toasted. The product is then cooled and ground to a meal or to grits. These in turn can be ground further to flour. The grits, meal or flour generally contains from about 45 to about 60% protein depending upon subsequent processing or additives added thereto. Alternatively, after cooking and toasting the defatted flakes can be treated to remove the sugars to yield a higher percentage protein product, i.e. a product having about 65% protein. Even higher protein products approaching 90% protein can be obtained by isolating the protein from all other components of the defatted flake.

The lecithin removed from the defatted flakes by the solvent extraction can be separated from the oil and added back to the defatted flakes to increase the fat content of the soy flour or soy grits.

Typically, to produce a soy based hydrolyzed vegetable protein via the prior art processes, a deoiled soy material, i.e. as for instance soy flour, soy grits, soy meal, is acid hydrolyzed. The acid used in the acid hydrolysis is then neutralized and a dry product obtained by spray drying or the like. Typically, this soy based hydrolyzed vegetable protein contains up to 45 or 50% salts and around 10% monosodium glutamate. This product generally has a pH of about pH 5.2 or 5.3. When judged strictly on its flavoring characteristics, such hydrolyzed vegetable protein is extremely useful, however, when judged from an overall total health standpoint, the upwards of 50% salt content and the 10% monosodium glutamate content of this hydrolyzed protein detracts from its overall characteristics and acceptability for use in food products directed to those who are more health conscious.

This invention is directed to a soy hydrolysate product that contrary to prior soy based hydrolyzed protein products does not have a high salt content nor a high monosodium glutamate level. When used to enhance the characteristics of certain sea food products, as for instance canned tuna fish which itself contains a small amount of monosodium glutamate, i.e. about 0.25%, since the monosodium glutamate content of the soy hydrolysate of the invention is less than that naturally found in the tuna fish itself, addition of the soy hydrolysate of the invention to the tuna fish will result in an overall reduction of the monosodium glutamate content of the final product. When tuna fish is thus treated with a soy hydrolysate of the invention, the natural moisture retaining properties of the soy hydrolysate can be used to retain the natural juices of the tuna fish without increasing the monosodium glutamate levels of the fish. Further, the overall low sodium content and thus the overall low sodium chloride content of the soy hydrolysate of the invention does not result in increases in the salt content of the tuna fish. At the same time the natural moistures of the tuna fish are retained in the tuna fish flesh and are not allowed to leach out during storage. This prevents these natural moistures and materials solvated therein from reacting with the inside of the can utilized for canning the tuna fish. Since these materials are not available to react with the inside of the can, the "tinny taste" which can be associated with canned tuna fish is prevented.

The process of preparing the soy hydrolysate of the invention when compared to prior processes for hydrolyzing soy based products is superior to prior processes, if for no other reason than because of its simplicity and thus its lower economic costs. Additionally, however, as a result of this process, formation of dichloro and monochloropropanol is inhibited thus restricting or reducing the amount of these products which are incorporated in the soy hydrolysate of the invention as compared to prior known hydrolyzed vegetable protein which is produced via hydrolyzing procedures conducted under pressure or in pressurized vessels.

While the soy hydrolysate of the invention does not have the detracting high levels of salt or monosodium glutamate compared to known soy based hydrolyzed vegetable proteins, it has superior organoleptic properties and imparts superior flavoring characteristics when added to fish, animal or poultry flesh. Thus, it is capable of serving as a flavor enhancer without contributing to the increase of the salt or the monosodium glutamate content of such products.

The soy hydrolysate of the invention and the process for preparing the same utilizes a deoiled soy material, as for instance soy flour, soy meal or soy grits, as the basic starting material. This material is suspended in water and a quantity of a protease enzyme added thereto. The suspension is heated to a processing temperature to solubilize both the material and the enzyme and held at this processing temperature for a period of time sufficient to hydrolyze a particular percentage of the peptide bonds of the protein within the soy material. Since no additional acid or base is added during the hydrolysis, the hydrolysis is conducted at essentially the pH of the material itself. Such pH generally ranging from about 6.6 to about 7.2.

The soy hydrolysate of the invention which is obtained from this essentially neutral hydrolysis procedure is very different with respect to its characteristics from that obtained from a low pH acid hydrolysis procedure. Contrary to a low pH acid hydrolysis soy hydrolysate, the hydrolysate of the invention is essentially a neutral product. This essentially neutral soy hydrolysate has excellent flavor characteristics without the presence of liberated glutamic acid which when neutralized would be converted to monosodium glutamate.

After hydrolysis, utilizing the essentially neutral pH enzymatic hydrolysis conditions of the invention, the degree of hydrolysis of the resulting sodium hydrolysate is from about 50 to about 53% with the typical product having about 53% of the peptide bonds undergoing hydrolysis. The molecular weight of this product is about 670,000 as compared to a molecular weight of about 1,400,000 for a standard soy flour which could serve as a starting material for the hydrolysis reaction of the invention.

The above molecular weights are as determined utilizing size exclusion chromatography. This is an analytical technique which separates molecules according to size with larger molecules eluding first from a size exclusion chromatographic column followed by progressively smaller molecules. A plot of the eluent of such a chromatographic column shows the largest molecules appearing at the earliest times. This technique is a preferred method for the analysis of high molecular weight compounds, particularly those of unknown composition. Size exclusion chromatography also provides a means for determining the distribution and molecular weight sizes in a heterogeneous sample resulting in a quantitative molecular weight distribution analysis.

Figure 2:
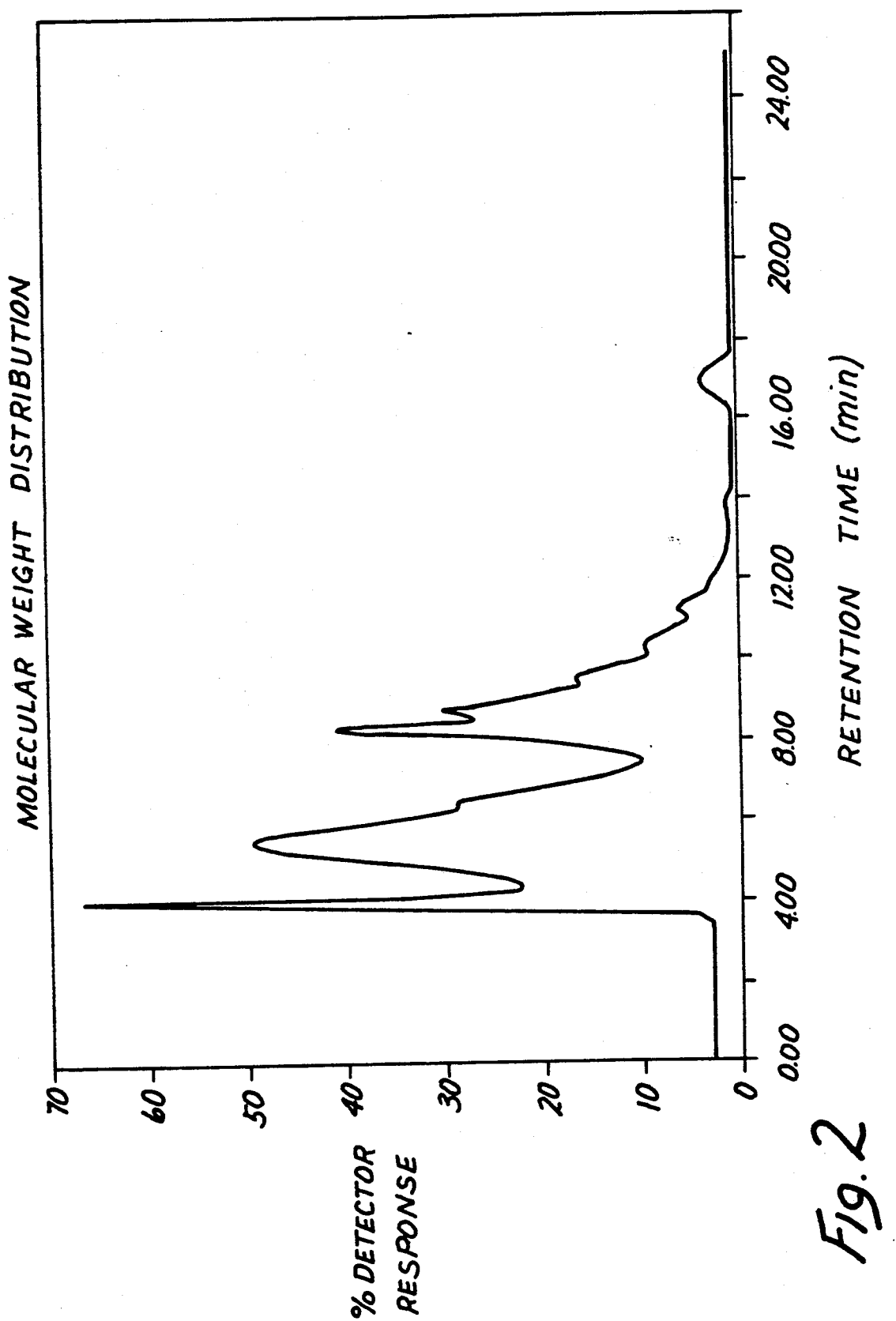
FIG. 2 is a graph of the molecular weight distribution of a soy flour utilized as the starting material in the process of the invention for making a soy hydrolysate of the invention.

The plots of FIGS. 1 and 2 show a size exclusion chromatography plot a soy hydrolysate of the invention in FIG. 1 and of a standard soy flour which has not been hydrolyzed in FIG. 2. As is evident from comparing the plots of FIG. 1 and FIG. 2, the plot of FIG. 1 shows considerably increase of longer retention time fractions indicating a decrease in the molecular size of the sample of the plot of FIG. 1 compared to that of FIG. 2.

In addition to the chromatographic plots other information can be extracted from such size exclusion chromatography as is shown in Tables 1 and 2 below. Table 1 is a molecular weight distribution report for a soy hydrolysate of the invention and Table 2 a similar molecular weight distribution report for the soy flour reference standard sample of FIG. 2.

TABLE 1
SOY HYDROLYSATE OF THE INVENTION
MOLECULAR WEIGHT DISTRIBUTION[1]

| | |
|---|---|
| Number Average (Mn) | 130780 |
| Weight Average (Mw) | 669560 |
| Z Average (Mz) | 2842490 |
| Polydispersity | 5.120 |

ESTIMATED % HYDROLYSIS

| | |
|---|---|
| Sample Mw: | 669560 |
| Standard Mw: | 1430180 |
| Estimated % Hydrolysis: | 53.2 |

[1]SEPARON HEMA-BIO 300 SEC Column, 8 × 250 mm, A 280 nm. Mobile phase: 0.2M Na2CO3, 1 ml/min.

TABLE 2
SOY FLOUR REFERENCE
MOLECULAR WEIGHT DISTRIBUTION[1]

| | |
|---|---|
| Number Average (Mn) | 193240 |
| Weight Average (Mw) | 1430180 |
| Z Average (Mz) | 3619014 |
| Polydispersity | 7.401 |

ESTIMATED % HYDROLYSIS

| | |
|---|---|
| Sample Mw: | 1430180 |
| Standard Mw: | 1430180 |
| Estimated % Hydrolysis: | 0.0 |

[1]SEPARON HEMA-BIO 300 SEC Column, 8 × 250 mm, A 280 nm. Mobile phase: 0.2M Na2CO3, 1 ml/min.

In addition to protein, the soy hydrolysate of the invention as well as the referenced soy flour of FIG. 2, contain other molecular moieties including a carbohydrate fraction and lipid fraction. These fractions also show up in the plots of the size exclusion chromatography and would be essentially unchanged by the hydrolysis reaction of the invention. For Tables 1 and 2, the polydispersivity quantitatively measures the breadth of molecular weight distribution with a value 1 being obtained for a completely monodispersed sample. The number average molecular weight (Mm) is an index of the smaller molecules in the distribution. The weighted average molecular weight (Mw) is an index of slightly larger molecules, and the Z average molecular weight (Mz) refers to the high molecular weight components of the distribution.

In a strictly qualitative manner it can be considered that the soy hydrolysate of the invention has a molecular weight of about 670,000±50,000 based on a standard molecular weight of about 1,400,000±50,000 for an unhydrolyzed soy flour protein. This represents a degree of hydrolysis of about 53%. As is evident from the plot of FIG. 1, there is little increase in the proportion of sample which is retained beyond about 16 minutes indicating that the soy hydrolysate of the invention is not hydrolyzed to such an extent that an overly abundant amount of free amino acids ar liberated. The hydrolysis is a limited hydrolysis—not a complete hydrolysis to free amino acids. Thus, the hydrolysis of the invention results in the formation of oligopeptides and not free amino acids. This is of particular importance with respect to glutamic acid. Glutamic acid comprises about 20% of the amino acids of soy protein. By avoiding the formation of glutamic acid, the process of the invention avoids the formation of monosodium glutamate.

A typical sodium hydrolysate of the invention is prepared as per Example 1.

EXAMPLE 1

1800 pounds of soy flour was admixed with 4500 pounds of water in a blender equipped with a high shear solubilizing impeller. 1500 grams of a fungal protease enzyme, i.e. Milezyme AFP 2000 available from Miles Laboratories, Elkhart, Ind., was added. At this point the solids, i.e. the soy flour and the enzyme, represents a 28% weight percent suspension of solids in the water. The soy flour and the protease enzyme in the water was stirred and steam was injected into the open reaction vessel. Steam was injected until a temperature of 90° F. was achieved. Steam and water contained therein to achieve this temperature resulted in an addition of 630 additional pounds of water thus diluting the solids content down to 26% weight percent solids. The resulting thick solution of soy flour and enzyme in water was stirred at 90° F. for 2 hours. The solution was then heated to 185° by steam injection to heat kill the enzyme. The resulting solution was then spray dried to yield a soy hydrolysate product of the invention. The product was dried to achieve a moisture content of below 20%, but preferable below 8%. The final moisture of the product ranged from 98% solids to about 92% solids based on a weight percentage.

The enzyme is used at a level of about 1000 to about 2000 grams per 1800 pounds soy flour. The percent of the solids, i.e. the soy flour and the enzyme to water, typically ranges from 18 weight percent solids to about 30 weight percent solids with a range of 26 to 28 percent being preferred. During enzymatic hydrolysis the temperature is maintained between 85° and 95° F. with a temperature of about 90° F. preferred. The hydrolysis is conducted from about 1 hour 45 minutes to about 2 hours 15 minutes with a time period of about 2 hours preferred. As noted above, the final product is dried to achieve a preferred moisture level of about 2 to about 8%, however, moistures levels up to about 20% might be acceptable depending upon the final use of the product.

The hydrolysis is conducted to hydrolyze from about 50 to about 55% of the peptide bonds in the protein of the soy material with a preferred value being about 53%.

Useful for starting materials for the soy hydrolysate of the invention are soy flour, soy meal and soy grits with soy flour being preferred because of its particle size and its ease of solubility.

Heating and stirring during the enzymatic hydrolysis of the soy material is conducted in an open vessel by steam injection. This inhibits the formation of chloropropanols including dichloro and monochloropropanols to a level below 5 parts per million or below.

Since no sodium is added, as would be typically added for neutralization of an acid hydrolyzed product, sodium levels in the final soy hydrolysate of the invention are extremely low being lower than 0.1%, but preferable lower than 0.06% and typically in a range of from about 0.01 to about 0.03%. Furthermore, since both the sodium levels are low and little or no free glutamic acid is liberated during the controlled hydrolysis, monosodium glutamate levels of the final sodium hydrolysate of the invention would be at a level less than 0.1 weight percent, but preferable less than 0.03 to 0.08 weight percent.

During hydrolysis typically the pH of the solution of the soy material and enzyme in the water is in a range of 6.6 to 7.2. Since no additional salts, acids or bases are added, after the hydrolysis is completed the dry product also has a pH in the range of 6.6 to 7.2.

For hydrolyzing the soy material into the soy hydrolysate of the invention, a protease enzyme is utilized. Such proteases are proteolytic enzymes. They are capable of attacking the peptide bond of proteins or peptides and hydrolyzing these bonds.

Preferred proteases of the invention are proteases from microbiological origins, as for instance fungal proteases or bacteriological proteases. A particularly preferred protease is the above described Milezyme AFP fungal protease. This protease is derived from the control fermentation of Aspergillus niger var. It is light tan to white in color, free of offensive odors, free of offensive tastes. According to the distributor of the same, i.e. Miles Laboratories, Elkhart, Ind., this enzyme has optimum hydrolytic activity at pH of 3.0 and a pH optimum range of 2.5 to 3.5 at 99° F. As such this is the pH range suggested by the distributor for optimum use of this enzyme. However, contrary to the use suggested by the distributor, as is indicated above, the hydrolysis of the soy material to the soy hydrolysate of the invention is conducted above pH 6 preferable in the range of pH 6.6 to pH 7.2. Thus, while the Milezyme AFP enzyme is considered as an acid fungal protease, as used in the instant process of the invention, it is not used as an acid protease, but in fact is utilized as a neutral protease.

Another useful enzyme is an enzyme sold by Nova Laboratories, Wilton, Conn. under the tradename of Neutrase. This is a bacterial derived enzyme obtained from *Bacillus subtilis*. This enzyme is available as a clear brown liquid having a pH of pH 5.0 to 6.0 and has a minimum proteolytic activity of 0.5 AU/gm. This enzyme is a protease which is purified from culture liquid obtained from the *Bacillus subtilis*.

The soy hydrolysate of the invention, after hydrolysis and removal of moisture, will have a protein content of from about 45 to about 55 weight percent, a fat content of from about 1 to about 3 weight percent, an ash content of from about 5 to about 9 weight percent, a carbohydrate content of from about 32 to about 36 weight percent with the remainder 2 to 8 weight percent being water. Further, this product will have less than 0.1 weight percent sodium with preferable levels of sodium being effectively less than the 0.1 weight percent level. Additionally it will have a monosodium glutamate level also less than 0.1 weight percent with preferred levels even being less than that.

A typical analysis of the soy hydrolysate of the invention yields 50.9 weight percent protein, 2.1 weight percent moisture, 1.9 weight percent fat, 6.9 weight percent ash, and 38.2 weight percent carbohydrate. This product had a sodium content of 0.024 weight percent. Additionally the monosodium glutamate was only present at 0.06 weight percent.

Both the amino acid content and the metals contents of the soy hydrolysate of the invention are extremely similar to those of the soy material utilized for the starting material. This is because of the lack of the addition of any further cations or anions during the hydrolysis procedure coupled with the mild hydrolysis procedure which does not degrade any individual amino acids from either the peptide chains of the starting material or the peptide chains of the product.

A typical amino acid analysis of the protein content of the soy hydrolysate of the invention will yield an amino acid content of about:

| | | | |
|---|---|---|---|
| 4.4 ± 0.5% | isoleucine | 8.0 ± 0.5% | leucine |
| 6.4 ± 0.5% | lysine | 5.1 ± 0.5% | phenylalanine |
| 4.3 ± 0.5% | threonine | 1.0 ± 0.5% | tryptophan |
| 4.6 ± 0.5% | valine | 1.3 ± 0.5% | methionine |
| 1.2 ± 0.5% | cystine | 4.6 ± 0.5% | alanine |
| 7.1 ± 0.5% | arginine | 12.1 ± 1.0% | aspartic acid |
| 19.8 ± 1.0% | glutamic acid | 4.4 ± 0.5% | glycine |
| 2.6 ± 0.5% | histidine | 5.7 ± 0.5% | proline |
| 5.8 ± 0.5% | serine | 3.4 ± 0.5% | tyrosine |

It is, of course recognized that the amino acid content will be somewhat variable depending upon the protein content of the soy product, i.e. the soy flour, the soy meal or the soy grits, utilized as a starting material. For this reason the amino acid values are given a variance of ±0.5% for those amino acids which are present at less than 10% of the total protein and ±1.0% for those amino acids which are present in an amount greater than 10% of the total protein.

As with the amino acids, the metals present in the soy hydrolysate of the invention are reflective of the metals which are initially present in the soy material. Since there are no anionic species from any acid hydrolysis procedure which must be neutralized with cations, no additional metal ions are necessary or are added during the process of the invention. Thus, low levels of alkaline and alkaline earth metals are maintained. Further, since the soy hydrolysate of the invention is not chelated with heavy metals, as for instance, iron, manganese and the like, even lower levels of such heavy metals are maintained in the soy hydrolysate of the invention.

Typically, potassium is present at a level of about 2.0 to 2.5 in the soy flour, soy meal or soy grit starting material used in the process of the invention. As such, the potassium level of the final soy hydrolysate of the invention is at a level less than about 2.5 weight percent. Calcium, magnesium and phosphorus are present in amounts below about 0.1 weight percent with other metals only present in amounts less than 100 parts per million or 0.01 weight percent. Such other metals include aluminum, barium, chromium, copper, iron, magnesium, strontium and zinc. These metals may be completely absent if the soy flour, soy mill or soy grit utilized for the starting material for the process of the invention does not contain such metals, however, if they are, in fact, contained in the soy flour, soy grit or soy meal, the metals will be present in the final product at the same level as they were in the starting material.

It is evident that the soy hydrolysate of the invention maintains the same nutritional values as soy protein from raw soy beans since the individual amino acids of the protein are maintained and since physiologically necessary minerals, i.e. calcium, phosphorus, iron, etc., are also maintained in the soy hydrolysate produced from the soy flour, soy meal or soy grits.

The soy hydrolysate of the invention makes an excellent flavor enhancer for fish products such as tuna and the like as well as animal and poultry flesh. It has superior organoleptic properties with respect to aroma, flavor and appearance. In order to demonstrate these organoleptic properties, a soy hydrolysate of the invention was tested side by side against a commercial hydrolyzed soy protein by a researcher skilled in the art of use of standard sensory evaluation techniques. Comparisons were made based on flavor, appearance and aroma.

ORGANOLEPTIC TESTS

Samples of a commercial hydrolyzed soy protein, Vegamine V-128 obtained from Griffith Laboratories, Chicago, Ill., and a soy hydrolysate of the invention were analyzed both in dry form and in solution in boiling water. For the dry powder evaluation, the samples were placed in clean china cups and the aroma and flavor impressions were recorded in order of appearance along with the intensity of each descriptive character. The aroma was first evaluated followed by the flavor. For evaluation in solution, equal portions of the samples were placed in separate clean china cups and 60 ml. boiling water was added to each cup. The aroma was evaluated while the solutions were hot and after cooling to 70° F. the flavor was evaluated. The results of these tests are shown in Table 3.

TABLE 3
ORGANOLEPTIC COMPARISONS

| | Vegamine V-128 HVP | Soy Hydrolysate of the invention |
|---|---|---|
| DRY POWDERS | | |
| | Overall Impression 2 | Overall Impression 1-2 |
| Aroma | Medicinal 2-3 | Sl. Sweet Grass 1 |
| | Broth 1 | |
| Flavor | Brothy 1 | Oatmeal 2 |
| | Medicinal burnt rubber 2 | Soy 1 |
| | Salty 2 | Creamy 1 |
| | MSG type 1 | No aftertaste |
| | Slight bitter aftertaste 1 | |
| Appearance | Dark color | Light cream color |
| BROTH COMPARISON | | |
| | Overall Impression 1-2 | Overall Impression 2-3 |
| Aroma | Bullion beef base 2 | Cereal 3 |
| | Sl. Oil 1 | Sweet Grass 1 |
| | Oily | Wallpaper paste 1-2 |
| Flavor | Burnt rubber 2 | Soy 2 |
| | Beefy 2 | Cut grass 1-2 |
| | Bitter 1 | Cereal 1-2 |
| | Salty-MSG 1 | |
| Appearance | Brown solution | Creamy solution |

The Vegamine V-128 HVP had a dark tan color and did not flow as easily as the soy hydrolysate of the invention. The soy hydrolysate of the invention is a cream colored fine powder that appears to be much less hydroscopic than the Vegamine V-128 HVP. As solutions, the Vegamine V-128 HVP fully dissolved into a light brown tea color in the water. The solution of the soy hydrolysate of the invention was cream colored with portions of the product settling quickly to the bottom of the container to form a chalky bottom layer with a dilute cream color portion on the top. The Vegamine V-128 HVP flavor and aroma overall was moderately reminiscent of burnt rubber, beef broth and a salty MSG background flavor. The soy hydrolysate of the invention received stronger scores in the cereal character notes of oatmeal, cereal, soy flavor and sweet grass. From these tests it is evident that the soy hydrolysate of the invention is quite different from commercial hydrolyzed soy protein in color, aroma and flavor in both dry and solution form.

In my prior U.S. Pat. No. 4,600,588, the entire disclosure of which is incorporated herein, I disclose a hydrolysis process for treating certain milk proteins, particularly casein. The process of the instant invention differs in several respects with respect to that process. A particular important difference is the time of treatment. In my prior process the casein or other milk solids were only treated for 30 minutes. Quite contrary to the treatment of casein, the treatment of the soy protein of this invention requires an extended treatment of at least one hour and 45 minutes. If casein is treated for this time period, i.e. at least an hour and 45 minutes, the resulting hydrolysate is very bitter and does not have the same organoleptic properties as per the soy hydrolysate of the instant invention. In the process of U.S. Pat. No. 4,600,588, in treating casein a basic (i.e. high pH) hydrolysis was utilized including the addition of sodium or potassium hydroxide to increase the pH up to pH 10. As per the instant process, no additional sodium ion is added and thus by the instant process, the low sodium content of the soy hydrolysate of the invention can be maintained.

What is claimed is:

1. A low sodium, low monosodium glutamate soy hydrolysate comprising:
   from about 45 to about 55 weight percent of an enzymatically hydrolyzed soy based protein;
   from about 1 to about 3 weight percent fat;
   from about 5 to about 9 weight percent ash;
   from about 2 to about 8 weight percent water;
   from about 32 to about 36 weight percent carbohydrate; and
   less than about 0.1 weight percent sodium.

2. A low sodium, low monosodium glutamate soy hydrolysate of claim 1 further including:
   less than about 1 weight percent of a heat deactivated protease enzyme.

3. A low sodium, low monosodium glutamate soy hydrolysate of claim 2 wherein:
   said heat deactivated protease enzyme is a heat deactivated fungal protease enzyme.

4. A low sodium, low monosodium glutamate soy hydrolysate of claim 1 further including:
   less than about 0.1 weight percent monosodium glutamate.

5. A low sodium, low monosodium glutamate soy hydrolysate of claim 1 further including:
   less than about 5 part per million of chloropropanols selected from the group consisting of dichloropropanol and monochloropropanol.

6. A low sodium, low monosodium glutamate soy hydrolysate of claim 1 wherein:
   said enzymatically hydrolyzed soy protein is hydrolyzed such that from about 50 to about 55% of the peptide bonds of said protein are hydrolyzed.

7. A low sodium, low monosodium glutamate soy hydrolysate of claim 1 wherein:
   said enzymatically hydrolyzed soy protein has an amino acid composition of about 4.4±0.5% isoleucine, 8.0±0.5% leucine, 6.4±0.5% lysine, 5.1±0.5% phenylalanine, 4.3±0.5% threonine, 1.0±0.5% tryptophan, 4.6±0.5% valine, 1.3±0.5% methionine, 1.2±0.5% cystine, 4.6±0.5% alanine, 7.1±0.5% arginine, 12.1±1.0% aspartic acid, 19.8±1.0% glutamic acid, 4.4±0.5% glycine, 2.6±0.5% histidine, 5.7±0.5% proline, 5.8±0.5% serine, and 3.4±0.5% tyrosine.

8. A low sodium, low monosodium glutamate soy hydrolysate of claim 1 wherein:
   said enzymatically hydrolyzed soy protein has an average molecular weight of about 670,000±50,000 based on a standard molecular weight of about 1,400,000±50,000 for an unhydrolyzed so flour protein.

9. A low sodium, low monosodium glutamate soy hydrolysate of claim 1 wherein:
the pH of said soy hydrolysate is from about 6.6 to about 7.2.

10. A low sodium, low monosodium glutamate soy hydrolysate of claim 1 further including:
metals individually chosen from the group consisting of aluminum, barium, chromium, copper, iron, manganese, strontium and zinc present in an amount from 0 to about 0.01 weight percent;
metals individually chosen from the group consisting of calcium, magnesium and phosphorus present in an amount from 0 to about 0.1 weight percent; and
potassium present at a level less than about 2.5 weight percent.

11. A soy protein hydrolysate comprising:
a protein containing soy material selected from the group consisting of soy flour, soy meal and soy grits enzymatically hydrolyzed such that from about 50 to about 55% of the peptide bonds of the protein of said soy material are hydrolyzed and said protein has an amino acid composition of about 4.4±0.5% isoleucine, 8.0±0.5% leucine, 6.4±0.5% lysine, 5.1±0.5% phenylalanine, 4.3±0.5% threonine, 1.0±0.5% tryptophan, 4.6±0.5% valine, 1.3±0.5% methionine, 1.2±0.5% cystine, 4.6±0.5% alanine, 7.1±0.5% arginine, 12.1±1.0% aspartic acid, 19.8±1.0% glutamic acid, 4.4±0.5% glycine, 2.6±0.5% histidine, 5.7±0.5% proline, 5.8±0.5% serine, and 3.4±0.5% tyrosine;
less than 0.1 weight percent of sodium; and
less than 0.1 weight percent of monosodium glutamate.

12. A soy protein hydrolysate of claim 11 including:
said hydrolysate having a pH of from about 6.6 to about 7.2.

13. A soy protein hydrolysate of claim 11 wherein:
said enzymatically hydrolyzed protein of said soy material has an average molecular weight of about 670,000±50,000 based on a standard molecular weight of about 1,400,000±50,000 for an unhydrolyzed soy flour protein.

14. A soy protein hydrolysate of claim 11 further including:
metals individually chosen from the group consisting of calcium, magnesium and phosphorous present in an amounts less than about 0.1 weight percent;
potassium present at a level less than about 2.5 weight percent; and
metals individually chosen from the group consisting of aluminum, barium, chromium, copper, iron, manganese, strontium and zinc present in amounts not exceeding 0.01 weight percent.

* * * * *